(12) United States Patent
Yun et al.

(10) Patent No.: US 11,807,730 B2
(45) Date of Patent: *Nov. 7, 2023

(54) COMPOSITION FOR FORMING POLYIMIDE FILM FOR COVER WINDOW, METHOD FOR PREPARING THE SAME, AND USE THEREOF

(71) Applicants: SK Innovation Co., Ltd., Seoul (KR); SK ie technology Co., Ltd., Seoul (KR)

(72) Inventors: Cheol Min Yun, Daejeon (KR); Hye Jin Park, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/841,177

(22) Filed: Jun. 15, 2022

(65) Prior Publication Data
US 2023/0002576 A1  Jan. 5, 2023

(30) Foreign Application Priority Data
Jun. 16, 2021 (KR) .................. 10-2021-0077760

(51) Int. Cl.
| | |
|---|---|
| *B32B 27/28* | (2006.01) |
| *C08G 73/10* | (2006.01) |
| *C08J 7/04* | (2020.01) |
| *C08J 5/18* | (2006.01) |

(52) U.S. Cl.
CPC ............ *C08J 7/0427* (2020.01); *B32B 27/281* (2013.01); *C08G 73/1032* (2013.01); *C08G 73/1039* (2013.01); *C08G 73/1042* (2013.01); *C08G 73/1064* (2013.01); *C08J 5/18* (2013.01); *B32B 2457/20* (2013.01); *C08J 2379/08* (2013.01); *C08L 2201/10* (2013.01); *C08L 2203/16* (2013.01)

(58) Field of Classification Search
CPC ........ C08J 7/0427; C08J 5/18; C08J 2379/08; B32B 27/281; B32B 2457/20; C08L 2201/10; C08L 2203/16; C08G 73/1042; C08G 73/1032; C08G 73/1039; C08G 73/1064; C08G 73/1075; G09F 9/301
See application file for complete search history.

(56) References Cited

U.S. PATENT DOCUMENTS

| | | | |
|---|---|---|---|
| 2020/0095376 A1 | 3/2020 | Yun et al. | |
| 2021/0009760 A1 | 1/2021 | Nakayama et al. | |
| 2021/0024699 A1* | 1/2021 | Uno | ............... H05K 1/03 |

FOREIGN PATENT DOCUMENTS

| | | | | | |
|---|---|---|---|---|---|
| CN | 111971327 | A | | 11/2020 | |
| JP | 2016162403 | A | * | 9/2016 | .......... B32B 27/08 |
| JP | 2019108539 | A | * | 7/2019 | ........ C08G 73/1007 |
| KR | 1020160037489 | A | | 4/2016 | |
| KR | 1020190038268 | A | | 4/2019 | |
| WO | WO-2014148441 | A1 | * | 9/2014 | .......... B32B 27/08 |
| WO | WO-2021031924 | A1 | * | 2/2021 | ........ C08G 73/1007 |

* cited by examiner

*Primary Examiner* — John D Freeman
(74) *Attorney, Agent, or Firm* — THE WEBB LAW FIRM

(57) ABSTRACT

Provided are a composition for forming a polyimide film for a cover window which may satisfy performance required for an advanced cover window, a method for preparing the same, and a use thereof. According to an implementation, a polyimide film for a cover window, which has excellent visibility without optical stain while colorless and transparent optical properties were not deteriorated and has excellent heat resistance and mechanical properties, and thus, is for use in optical applications, may be provided. In addition, a polyimide film for a cover window according to an implementation may be useful in various display devices.

18 Claims, No Drawings

COMPOSITION FOR FORMING POLYIMIDE FILM FOR COVER WINDOW, METHOD FOR PREPARING THE SAME, AND USE THEREOF

CROSS-REFERENCE TO RELATED APPLICATION

This application claims priority to Korean Patent Application No. 10-2021-0077760 filed Jun. 16, 2021, the disclosure of which is hereby incorporated by reference in its entirety.

BACKGROUND OF THE INVENTION

Field of the Invention

The following disclosure relates to a composition for forming a polyimide film for a cover window, a method for preparing the same, and a use thereof.

Description of Related Art

A polyimide film (PI) has ultrahigh heat resistance of insolubility and infusibility, and has excellent thermal oxidation resistance, heat resistance, radiation resistance, low temperature properties, and chemical resistance. Thus, the polyimide film is being used in a wide range of technologies such as heat-resistant advanced material such as automobile materials, aviation materials, and spacecraft materials, and electronic materials such as insulation coating agents, insulating films, semiconductors, and electrode protective films of TFT-LCD, and recently, the polyimide film is drawing attention as a material for replacing expensive tempered glass used for a cover window of a portable electronic instruments and communication equipment.

The cover window of a portable electronic instrument and communication equipment is for protecting electronic components such as a printed wiring board and a lead frame of a semiconductor integrated circuit, and should have insulation at or above a certain level. In addition, as the portable electronic instrument and the communication equipment are thinner, slimmer, and more flexible, flexibility is required together with mechanical properties such as high hardness and high rigidity. In addition, since generally a coating layer is laminated on a substrate for imparting various physical properties, diffuse reflection of light is caused on a cover window and optical stain occurs to deteriorate visibility, and thus, optical properties such as high display quality and having no mura phenomenon are required.

SUMMARY OF THE INVENTION

Technical Problem

An embodiment is directed to providing a composition for forming a polyimide film for a cover window which may satisfy performance required for an advanced cover window, and a method for preparing the same.

Specifically, an embodiment is directed to providing a composition for forming a polyimide film for a cover window, for providing a polyimide film for a cover window which may implement an improved yellow index and may have an anti-reflection effect in a wide viewing angle to significantly decrease a mura phenomenon, and a method for preparing the same.

Another embodiment is directed to providing a polyimide film for a cover window which has excellent optical properties such as no optical stain and excellent visibility without degradation of colorless and transparent optical properties and has excellent heat resistance and mechanical properties to be used as an optical use of a display device.

Another embodiment is directed to providing a multilayer structure including the polyimide film.

Another embodiment is directed to providing a cover window for a display device including the polyimide film.

Still another embodiment is directed to providing a flexible display device including the polyimide film or the cover window.

Solution to Problem

In one general aspect, a composition for forming a polyimide film for a cover window includes: a polyamic acid or a polyimide including a structural unit derived from a dianhydride and a structural unit derived from a diamine; and a mixed solvent of an amide-based solvent and a hydrocarbon-based solvent, the hydrocarbon-based solvent being included at 10 to 40 wt % with respect to a total weight of the mixed solvent. In the composition for forming a polyimide film for a cover window according to a specific implementation, the structural unit derived from a dianhydride may include a structural unit derived from a compound represented by the following Chemical Formula 1 and a compound represented by the following Chemical Formula 2, and the structural unit derived from a diamine may include a structural unit derived from a compound represented by the following Chemical Formula 3 and a compound represented by the following Chemical Formula 4:

[Chemical Formula 1]

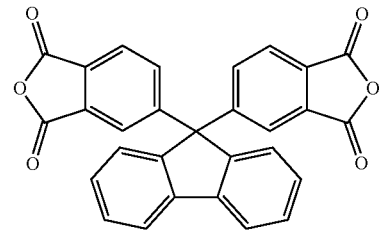

[Chemical Formula 2]

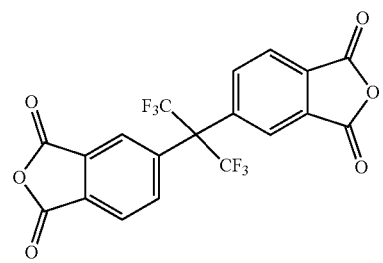

[Chemical Formula 3]

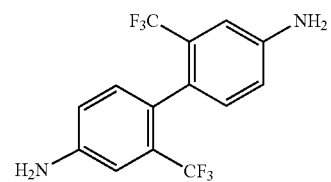

[Chemical Formula 4]

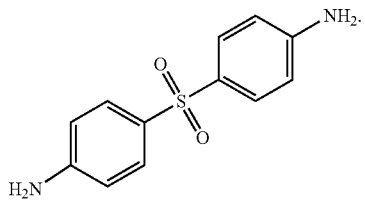

The amide-based solvent may include dimethylpropionamide.

The hydrocarbon-based solvent may be a cyclic hydrocarbon-based solvent.

The cyclic hydrocarbon-based solvent may include toluene, benzene, cyclohexane, or a combination thereof.

The composition for forming a polyimide film for a cover window according to an implementation may include a solid content of 10 to 40 wt % with respect to a total weight of the composition for forming a polyimide film for a cover window.

In the composition for forming a polyimide film for a cover window, the structural unit derived from the compound represented by Chemical Formula 1 may be included at 70 mol % to 95 mol %, based on 100 mol % of the structural unit derived from a dianhydride.

In the composition for forming a polyimide film for a cover window, the structural unit derived from the compound represented by Chemical Formula 3 may be included at 70 mol % to 95 mol %, based on 100 mol % of the structural unit derived from a diamine.

In another general aspect, a method for manufacturing a polyimide film for a cover window includes: i) reacting a compound represented by the following Chemical Formula 1 and a compound represented by the following Chemical Formula 2 with a compound represented by the following Chemical Formula 3 and a compound represented by the following Chemical Formula 4 in the presence of an amide-based solvent to prepare a polyamic acid solution;

ii) further adding a hydrocarbon-based solvent to the polyamic acid solution to adjust crystallinity of the polyamic acid; and iii) applying a composition for forming a polyimide film for a cover window obtained in step ii) on a substrate and performing curing, wherein the hydrocarbon-based solvent in step ii) is further added so as to be 10 to 40 wt % with respect to a total weight of the amide-based solvent and the hydrocarbon-based solvent:

[Chemical Formula 1]

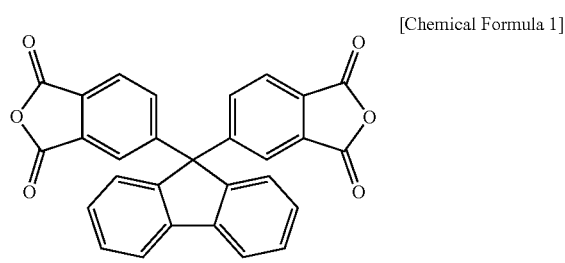

[Chemical Formula 2]

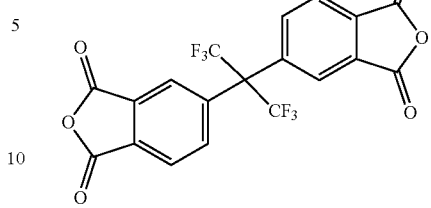

[Chemical Formula 3]

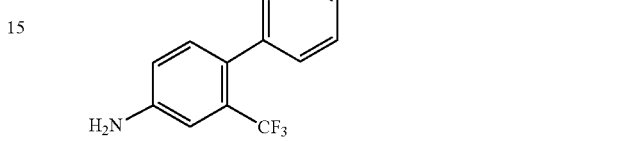

[Chemical Formula 4]

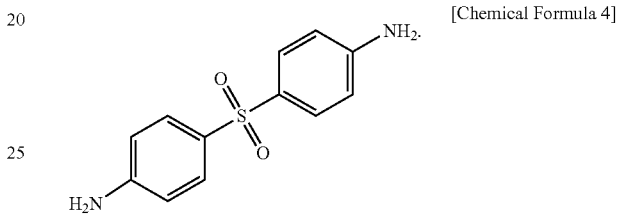

The curing step in step iii) may be performed by heating at 80 to 300° C.

After the application in step iii), a step of allowing the applied substrate to stand at normal temperature may be further included.

In another general aspect, a polyimide film for a cover window manufactured from the composition for forming a polyimide film for a cover window is provided.

The polyimide film may have a thickness of 30 to 150 μm and a yellow index (YI) in accordance with ASTM E313 of 3.5 or less.

The polyimide film may have a thickness of 40 to 80 μm and a yellow index (YI) in accordance with ASTM E313 of 1.0 to 2.7.

In another general aspect, a multilayer structure includes the polyimide film formed on one surface of a substrate.

The multilayer structure may further include a coating layer formed on the polyimide film.

The coating layer may be a hard coating layer, an antistatic layer, an anti-fingerprint layer, an antifouling layer, an anti-scratch layer, a low refractive index layer, an anti-reflection layer, a shock absorbing layer, or a combination thereof.

In another general aspect, a cover window for a display device includes the polyimide film.

In still another general aspect, a flexible display device includes the cover window for a display device.

Advantageous Effects of Invention

According to an implementation, the composition of the present invention inhibits an interaction between a polyamic acid and a mixed solvent, thereby significantly decreasing an intermolecular packing density during curing. Thus, a polyimide film for a cover window which may implement both excellent optical properties and excellent mechanical properties without deteriorating colorless and transparent properties may be provided. In addition, the film is flexible and has excellent bending properties, so as to be applied to a cover window of a flexible display.

According to an implementation, an intermolecular interaction which is a disadvantage of the polyimide film is efficiently controlled, whereby excellent optical properties as well as excellent mechanical properties such as a modulus and an elongation at break are shown while having excellent adhesion, and thus, when the present invention is used as a cover window of a display panel, not only a decrease in a yellow index causing visibility, but also a mura phenomenon, in particular, rainbow mura by retardation, is effectively suppressed, thereby increasing reliability of a display panel including the cover window.

DESCRIPTION OF THE INVENTION

Hereinafter, an implementation will be described in detail so as to be easily practiced by a person skilled in the art to which the present invention pertains. However, the present invention may be implemented in various different forms and is not limited to the implementations described herein. In addition, it is not intended to limit the protection scope defined in the claims.

In addition, technical terms and scientific terms used in the present specification have the general meaning understood by a person skilled in the art unless otherwise defined, and description for the known function and configuration obscuring the present invention will be omitted in the following description.

Throughout the present specification, unless explicitly described to the contrary, "comprising" any constituent elements will be understood to imply further inclusion of other constituent elements rather than the exclusion of any other constituent elements.

Hereinafter, unless otherwise defined in the present specification, it will be understood that when a part such as a layer, a film, a thin film, a region, or a plate is referred to as being "on" or "above" another part, it may include not only the case of being "directly on" the other part but also the case of having an intervening part therebetween.

Hereinafter, unless otherwise defined in the present specification, a "combination thereof" refers to a mixture or copolymerization of constituents.

Hereinafter, unless otherwise particularly defined in the present specification, the term "A and/or B" may refer to an embodiment including both A and B or an embodiment selecting one of A and B.

Hereinafter, unless otherwise particularly defined in the present specification, a "polymer" refers to a molecule which has a relatively high molecular weight and the structure may include multiple repetition of a unit derived from a low molecular weight molecule. In an embodiment, the polymer may be an alternating copolymer, a block copolymer, a random copolymer, a branched copolymer, a cross-linked copolymer, or a copolymer including all of them (for example, a copolymer including more than one monomer). In another embodiment, the polymer may be a homopolymer (for example, a copolymer including one monomer).

Hereinafter, unless otherwise particularly defined in the present specification, a "polyamic acid" refers to a polymer including a structural unit having an amic acid moiety, and a "polyimide" may refer to a polymer including a structural unit having an imide moiety.

Hereinafter, unless otherwise particularly defined in the present specification, a polyimide film may be a film including a polyimide, specifically, a highly heat-resistant film manufactured by solution polymerization of a dianhydride compound and a diamine compound or a diisocyanate compound to prepare a polyamic acid, which is then cyclized and dehydrated at a high temperature to be imidized.

Hereinafter, unless otherwise particularly defined in the present specification, a "mura phenomenon" may be interpreted as including all distortion phenomena by light which may be caused at a certain angle. For example, distortion by light, such as a black out phenomenon in which a screen looks black, a hot spot phenomenon, or a rainbow phenomenon having an iridescent stain in a display device including a polyimide film may be included.

Conventionally, there have been many attempts to combine or change monomers having various structures for increasing optical properties and mechanical properties while imparting functionality to a polyimide film. However, mechanical properties and optical properties are in a trade-off relationship with each other, and the attempts were bound to produce extremely general results of decreased functionality or deteriorated optical properties even with better mechanical properties. Thus, a new attempt to impart all of excellent mechanical properties, functionality, and optical properties is needed.

The composition for forming a polyimide film according to an implementation (hereinafter, also referred to as a polyimide film forming composition) may provide a polyimide film having all of improved optical properties, functionality, and mechanical properties, by applying a non-polar solvent which may not be used as a polymerization solvent of a polyamic acid (hereinafter, also referred to as a polyimide precursor) and/or polyimide and has no compatibility with polyimide. Specifically, the composition for forming a polyimide film according to an implementation may provide a polyimide film which has an improved yellow index while having adhesion equal to or higher than a conventional optical adhesive film, and has significantly reduced distortion by light. Accordingly, the polyimide film manufactured from the polyimide film forming composition according to an implementation may be applied to a new substrate material or cover window material which may be applied to a foldable or flexible display device, and the polyimide film may have excellent visibility to minimize the user's eye-strain.

The composition for forming a polyimide film according to an implementation may include a polyamic acid and/or a polyimide; a polar solvent; and a non-polar solvent. The polar solvent may be a hydrophilic solvent, for example, may have compatibility with a polyamic acid and/or polyimide, and for example, may be an amide-based solvent. In addition, the non-polar solvent may have little compatibility with a polyamic acid and/or polyimide, and for example, may be a hydrocarbon-based solvent.

Without being bound to a specific theory, by using a mixed solvent of an amide-based solvent and a hydrocarbon-based solvent, an intermolecular interaction between polymers and/or an interaction between a polymer and a solvent may be effectively inhibited, and intermolecular packing density during curing may be significantly decreased, so that both excellent optical properties and mechanical properties to be desired may be improved.

Thus, the composition for forming a polyimide film according to an implementation may represent intermolecular behavior and interaction which are different from those of a mixed solution in a step of polymerizing a polyamic acid. For example, when in the step of polymerizing a polyamic acid, the hydrocarbon-based solvent is included, it acts as a factor inhibiting polymerization, so that a high molecular weight polyamic acid may not be obtained. However, in the composition for forming a polyimide film according to an implementation, after obtaining a sufficient amount of high molecular weight polyamic acid and/or polyimide, the polyamic acid and/or the polyimide is/are mixed with the hydrocarbon-based solvent, thereby acting as a catalyst which weakens an intermolecular interaction between polymers and/or a strong interaction between a polymer and a solvent and obtaining desired optical properties in later curing.

A composition for forming a polyimide film for a cover window according to an implementation may include: a polyamic acid or a polyimide including a structural unit derived from a dianhydride and a structural unit derived from a diamine; and a mixed solvent of an amide-based solvent and a hydrocarbon-based solvent, the hydrocarbon-based solvent being included at 10 to 40 wt % with respect to a total weight of the mixed solvent. The structural unit derived from a dianhydride may include a structural unit derived from a compound represented by the following Chemical Formula 1 and a compound represented by the following Chemical Formula 2, and the structural unit derived from a diamine may include a structural unit derived from a compound represented by the following Chemical Formula 3 and a compound represented by the following Chemical Formula 4. Accordingly, a polyimide film for a cover window having improved optical properties by inhibiting a packing density and being made amorphous:

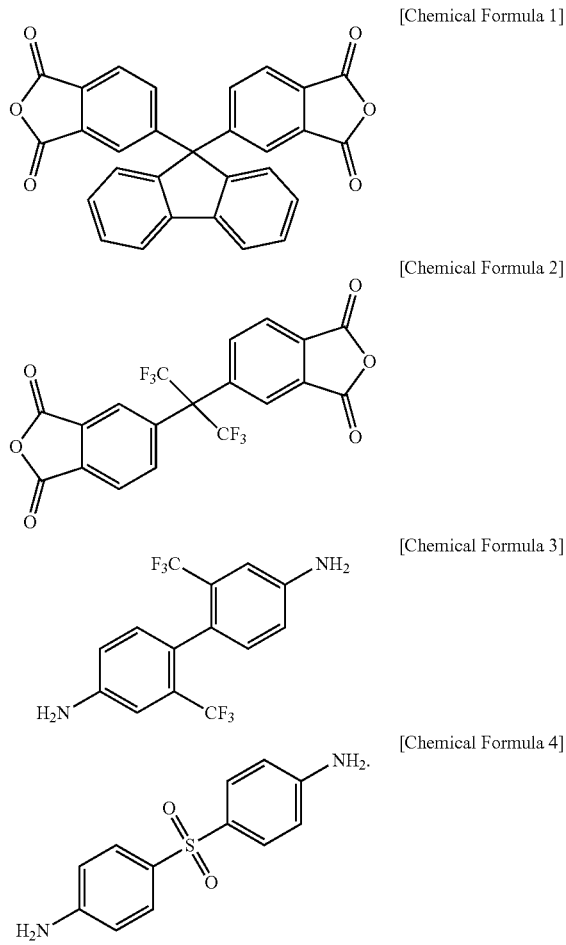

[Chemical Formula 1]

[Chemical Formula 2]

[Chemical Formula 3]

[Chemical Formula 4]

As described above, since the composition for forming a polyimide film for a cover window according to an implementation uses a mixed solvent of an amide-based solvent and a hydrocarbon-based solvent, specifically, a sufficient amount of high molecular weight polyamic acid and/or polyimide is obtained, and then the crystallinity of polyamic acid and/or polyimide in the solution is adjusted by adding the hydrocarbon-based solvent, thereby improving both excellent optical physical properties and mechanical properties. Here, by using the amide-based solvent and the hydrocarbon-based solvent sequentially, an interaction between the polyamic acid and/or the polyimide acid which is a polyimide precursor and/or the polyimide may be adjusted to a more appropriate range. Here, the adjustment may refer to inhibition.

The amide-based solvent refers to a compound including an amide moiety. The amide-based solvent may be an aromatic or an aliphatic, and for example, may be an aliphatic. In addition, for example, the amide-based solvent may be a cyclic compound or a chain compound, and specifically, may have 2 to 15 carbon atoms, and for example, 3 to 10 carbon atoms.

The amide-based solvent may include a N,N-dialkylamide moiety, and the dialkyl groups may be present independently or be fused with each other to form a ring, or at least one alkyl group of the dialkyl groups is fused with other substituents in the molecule to form a ring, and for example, at least one alkyl group of the dialkyl groups may be fused with an alkyl group connected to carbonyl carbon of an amide moiety to form a ring. Here, the ring may be 4-membered to 7-membered rings, for example, 5-membered to 7-membered rings, and for example, a 5-membered or 6-membered ring. The alkyl group may be a C1 to C10 alkyl group, for example, a C1 to C8 alkyl group, and for example, methyl, ethyl, and the like.

Specifically, the amide-based solvent is not limited as long as it is generally used in polymerization of the polyamic acid, but for example, may include dimethylpropionamide, diethylpropionamide, dimethylacetylamide, diethylacetamide, dimethylformamide, methylpyrrolidone, ethylpyrrolidone, octylpyrrolidone, or a combination thereof, and specifically, may include dimethylpropionamide.

The hydrocarbon-based solvent may be a non-polar solvent, as described above.

The hydrocarbon-based solvent may be a compound formed of carbon and hydrogen. For example, the hydrocarbon-based solvent may be aromatic or aliphatic, and for example, a cyclic compound or a chain compound, but specifically, may be a cyclic compound. Here, when the hydrocarbon-based solvent is a cyclic compound, it may include a monocycle or a polycycle, and the polycycle may be a condensed ring or a non-condensed ring, but specifically a monocyclic hydrocarbon-based solvent may be used.

The hydrocarbon-based solvent may have 3 to 15 carbon atoms, for example, 6 to 15 carbon atoms, and for example, 6 to 12 carbon atoms.

The hydrocarbon-based solvent may be a substituted or unsubstituted C3 to C15 cycloalkane, a substituted or unsubstituted C6 to C15 aromatic compound, or a combination thereof. Here, the cycloalkane may include cyclobutane, cyclopentane, cyclohexane, cycloheptane, cyclooctane, or a combination thereof, and the aromatic compound may include benzene, naphthalene, or a combination thereof.

The hydrocarbon-based solvent may be cycloalkane which is unsubstituted or substituted with at least one C1 to C5 alkyl group, an aromatic compound which is unsubstituted or substituted with at least one C1 to C5 alkyl group, or a combination thereof, and each of the cycloalkane and the aromatic compound may be as described above.

The C1 to C5 alkyl group may be, for example, a C1 to C3 alkyl group, for example, a C1 or C2 alkyl group, and more specifically, a methyl group, but is not limited thereto.

In addition, the hydrocarbon may further include oxygen, if necessary. For example, when the hydrocarbon-based solvent includes oxygen, it may include a ketone group or a hydroxyl group, and for example, may be cyclopentanone, cresol, or a combination thereof.

Specifically, the hydrocarbon-based solvent may include benzene, toluene, cyclohexane, cyclopentanone, cresol, or a combination thereof, but is not limited thereto.

More specifically, the composition for forming a polyimide film for a cover window according to an implementation may include a mixed solvent including an amide-based solvent including dimethylpropionamide and a hydrocarbon-based solvent selected from toluene, benzene, cyclohexane, and the like.

The composition for forming a polyimide film for a cover window according to an implementation includes a polyamic acid and/or a polyimide including the structural units derived from the diamine and the dianhydride exemplified above.

A solid content of the composition for forming a polyimide film for a cover window according to an implementation may satisfy a range of 10 to 40 wt %, 10 to 35 wt %, or 10 to 20 wt %, based on the total weight of the composition for forming a polyimide film. Here, the solid content may be the polyamic acid and/or the polyimide.

The composition for forming a polyimide film for a cover window according to an implementation may include 10 to 40 wt % of the hydrocarbon-based solvent. Here, wt % is based on the total weight of the solvent, and the total weight of the solvent as the bases refers to a sum of the total weight of the amide-based solvent and the hydrocarbon-based solvent.

In addition, when the conditions of the mixed solvent described above are satisfied, further improved yellow index and haze may be implemented, and together with the effect, adhesive strength with a substrate such as glass may be further significantly improved. That is, the mixed solvent may include the amide-based solvent and the hydrocarbon-based solvent at a weight ratio of 90:10 to 60:40.

The polyamic acid and/or the polyimide may have a weight average molecular weight (Mw) of 10,000 to 80,000 g/mol, 10,000 to 70,000 g/mol, or 10,000 to 60,000 g/mol.

The composition for forming a polyimide film for a cover window according to an implementation may further include a structural unit derived from one or two or more dianhydrides selected from 3,3',4,4'-biphenyltetracarboxylic dianhydride (BPDA), 3,3',4,4'-benzophenonetetracarboxylic dianhydride (BTDA), 4,4'-oxydiphthalic anhydride (ODPA), 4,4'-(4,4'-isopropylbiphenoxy)biphthalic anhydride (BPADA), 3,3',4,4'-diphenylsulfonetetracarboxylic dianhydride (DSDA), p-phenylenebistrimellitic monoester anhydride (TMHQ), 2,2'-bis(4-hydroxyphenyl)propanedibenzoate-3,3',4,4'-tetracarboxylic dianhydride (ESDA), naphthalenetetracarboxylic dianhydride (NTDA), ethyleneglycol bis(anhydro-trimellitate) (TMEG), and the like.

In addition, the composition for forming a polyimide film for a cover window according to an implementation may further include a structural unit derived from one or two or more diamines selected from p-phenylenediamine (PDA), m-phenylenediamine (m-PDA), 4,4'-oxydianiline (4,4'-ODA), 3,4'-oxydianiline (3,4'-ODA), 2,2-bis(4-[4-aminophenoxy]-phenyl)propane (BAPP), 1,4-bis(4-aminophenoxy)benzene (TPE-Q), 1,3-bis(4-aminophenoxy)benzene (TPE-R), 4,4'-bis(4-aminophenoxy)biphenyl (BAPB), 2,2-bis(4-[4-aminophenoxy]phenyl)sulfone (BAPS), 2,2-bis(4-[3-aminophenoxy]phenyl)sulfone (m-BAPS), 3,3'-dihydroxy-4,4'-diaminobiphenyl (HAB), 3,3'-dimethylbenzidine (TB), 2,2'-dimethylbenzidine (m-TB), 1,4-bis(4-amino-2-trifluoromethylphenoxy)benzene (6FAPB), 2,2'-bis(trifluoromethyl)-4,4'-diaminodiphenylether (6FODA), 1,3-bis(3-aminophenoxy)benzene (APB), 1,4-naphthalenediamine (1,4-ND), 1,5-naphthalenediamine (1,5-ND), 4,4'-diaminobenzanilide (DABA), 6-amino-2-(4-aminophenyl)benzoxazole, 5-amino-2-(4-aminophenyl)benzoxazole, and the like.

In addition, the aromatic diamine may further include a combination of fluorine-based aromatic diamines. Here, a specific embodiment of the fluorine-based aromatic diamine may further include 2,2'-bistrifluoromethylbenzidine (TFMB) with 1,4-bis(4-amino-2-trifluoromethylphenoxy)benzene (6FAPB), 2,2'-bis(trifluoromethyl)-4,4'-diaminodiphenylether (6FODA), or a combination thereof. Accordingly, a film having a higher total light transmittance and a lower haze may be provided.

The composition for forming a polyimide film according to an implementation may provide a polyamic acid and/or polyimide further including a structural units derived from the diamine and the dianhydride mentioned above.

Usually, in order to stably coat a thin film, a high solid content of 10 wt % or more (with respect to the total weight of the composition) is required, but a polyimide tends to have a higher viscosity with a higher concentration of the solid content. However, when the thin film is manufactured by a coating process, when a polymer flow is not good due to a high viscosity, it is difficult to remove bubbles and mura occurs during coating.

However, the composition for forming a polyimide film according to an implementation uses the mixed solvent of an amide-based solvent and a hydrocarbon-based solvent, thereby significantly lowering the viscosity of the composition, even though a high solid content is included. Accordingly, defects occurring in a coating process may be effectively prevented, thereby implementing more improved optical properties. Besides, as described above, when the amide-based solvent is used alone, it is difficult to increase a concentration of a solid content due to a high viscosity to decrease process efficiency, but since the composition for forming a polyimide film for a cover window according to an implementation has a low viscosity, it has no defects occurring in the coating process and a high solid content, thereby being commercially advantageous.

Furthermore, a cured film which is formed at a thickness of 30 to 150 μm by curing the composition for forming a polyimide film for a cover window, that is, a polyimide film for a cover window has further improved distortion by light as well as yellow index as compared with a polyimide film including a polyimide polymer formed of a rigid structure. For example, in the polyimide film for a cover window according to an implementation, the structural unit derived from a dianhydride may not include a rigid structural unit, and for example, may not include a structural unit derived from a dianhydride in which two anhydride groups are fused to one ring. The ring may be a single ring or a condensed ring, and may be an aromatic ring, an aliphatic ring, or a combination thereof. Specifically, the structural unit derived from a dianhydride may not include a structural unit derived from pyromellitic dianhydride (PMDA), a structural unit derived from cyclobutane-1,2,3,4-tetracarboxylic dianhydride (CBDA), or a combination thereof.

Accordingly, the polyimide film for a cover window according to an implementation may be transparent and implement a low retardation in the thickness direction even at a thickness of 30 µm or more and may further improve visibility, and thus, when a cover window including the polyimide film for a cover window is used, eye strain may be further decreased. In addition, even when the thickness is 30 µm or more, the excellent optical properties as described above may be shown, and thus, mechanical strength such as a modulus may be further improved and dynamic bending properties may be further improved, and thus, the polyimide film may be more appropriate for being applied as a cover window of a flexible display device in which folding and unfolding motions are repeated.

In the composition for forming a polyimide film for a cover window according to an implementation, the structural unit derived from the compound represented by Chemical Formula 1 may be included at 70 to 95 mol %, based on 100 mol % of the structural unit derived from a dianhydride. Here, the structural unit derived from a dianhydride is a total mol % of the structural unit derived from the compound represented by Chemical Formula 1 and the compound represented by Chemical Formula 2. By including the structural unit derived from the compound represented by Chemical Formula 1 as described above, the polyimide film for a cover window may be more transparent and impart a low retardation in the thickness direction, and also, may have better mechanical properties such as a modulus and an elongation at break, even when the thickness is 30 µm or more. Accordingly, optical properties and mechanical properties which are equivalent to or better than those of tempered glass may be implemented.

By including the structural unit derived from the compound represented by Chemical Formula 1 in the range described above, both mechanical properties and optical properties may be better. For example, the structural unit derived from the compound represented by Chemical Formula 1 may be included at 70 to 90 mol %, or 70 to 85 mol %, based on 100 mol % of the structural unit derived from a dianhydride.

In addition, in the composition for forming a polyimide film for a cover window according to an implementation, the structural unit derived from the compound represented by Chemical Formula 3 may be included at 70 to 95 mol %, based on 100 mol % of the structural unit derived from a diamine. Here, the structural unit derived from a diamine is a total mol % of the structural unit derived from the compound represented by Chemical Formula 3 and the compound represented by Chemical Formula 4. By including the structural unit derived from the compound represented by Chemical Formula 1 as described above, the polyimide film for a cover window may have further improved visibility with more stable positive wavelength dispersibility, and also, may have better mechanical properties such as a modulus and an elongation at break, even when the thickness is 30 µm or more. Accordingly, optical properties and mechanical properties which are equivalent to or better than those of tempered glass may be implemented.

For example, the structural unit derived from the compound represented by Chemical Formula 3 may be included at 70 to 90 mol %, more specifically 75 to 90 mol %, based on 100 mol % of the structural unit derived from a diamine. By including the structural unit derived from the compound represented by Chemical Formula 3 in the range described above, optical properties may be better.

Hereinafter, a use of the polyimide film for a cover window according to an implementation will be described.

A first embodiment according to an implementation may be a multilayer structure including the polyimide film for a cover window of the present invention. Here, the multilayer structure may include the polyimide film for a cover window of an implementation and a polyimide film including monomers having different compositions from each other as two or more coating layers.

In addition, a second embodiment according to an implementation may be a cover window for a display device including the polyimide film for a cover window of an implementation and a coating layer formed on the film.

In addition, a third embodiment according to an implementation may be a flexible display device including the polyimide film for a cover window of an implementation.

The polyimide film for a cover window according to an implementation may have a thickness of 30 to 150 µm, an absolute value of a retardation in the thickness direction ($R_{th}$) at a wavelength of 550 nm of 500 nm or less, and a yellow index (YI) in accordance with ASTM E313 of 3.5 or less. The retardation value in the thickness direction may be measured at normal temperature before heating the film, and the normal temperature may be a temperature in a state of being not artificially adjusted. For example, the normal temperature may be 20° C. to 40° C., 20° C. to 30° C., or 23 to 26° C.

The polyimide film for a cover window according to an implementation may have an absolute value of the retardation in the thickness direction ($R_{th}$) at a wavelength of 550 nm of 350 nm or less, or 50 to 300 nm, when its thickness is 30 to 150 µm. As an example, the polyimide film for a cover window may have an absolute value of the retardation in the thickness direction ($R_{th}$) at a wavelength of 550 nm of 50 to 250 nm, 80 to 240 nm, or 90 to 220 nm, when its thickness is 40 to 80 µm.

In addition, the polyimide film for a cover window according to an implementation may have a yellow index of 3.5 or less, 3.0 or less, 2.7 or less, or 1 to 2.7, when its thickness is 30 to 150 µm. As an example, the polyimide film for a cover window may have a yellow index of 1.0 to 2.7, or 1.5 to 2.5, when its thickness is 40 to 80 µm.

Specifically, the polyimide film for a cover window according to an implementation may satisfy both the retardation in the thickness direction ($R_{th}$) at a wavelength of 550 nm and the yellow index when its thickness is 30 to 150 µm. Also, the polyimide film for a cover window may satisfy both the retardation in the thickness direction ($R_{th}$) at a wavelength of 550 nm and the yellow index when its thickness is 40 to 80 µm.

In addition, the polyimide film for a cover window according to an implementation may have (a) a modulus in accordance with ASTM E111 of 4 GPa or more and satisfy (b) an elongation at break of 15% or more, and more specifically, may satisfy the mechanical properties as such together with the retardation in the thickness direction ($R_{th}$) at a wavelength of 550 nm and the yellow index described above, when its thickness is 30 to 150 µm.

The polyimide film for a cover window according to an implementation may have a modulus in accordance with ASTM E111 of, specifically, 4 GPa or more, 4.1 GPa or more, or 4.1 to 6 GPa. In addition, the polyimide film for a cover window may have an elongation at break of 15% or more, 16% or more, 18% or more, 20% or more, or 25 to 40%, and specifically, may satisfy both the modulus and the elongation at break described above. Accordingly, mechanical properties and durability sufficient to be applied to a cover window may be provided.

The first, second, or third embodiment according to an implementation includes a polyimide film for a cover window which may satisfy mechanical properties such as a modulus and an elongation at break while significantly reducing distortion by light, and if necessary, may further include a coating layer having functionality.

The coating layer is formed on at least one surface of the polyimide film for a cover window of an implementation or a substrate and a non-limiting example thereof may include a hard coating layer, an antistatic layer, an anti-fingerprint layer, an antifouling layer, a scratch-resistant layer, a low refractive index layer, an anti-reflection layer, a shock absorbing layer, and the like, and at least one or two or more coating layers may be provided. Here, the coating layer may have a thickness of 1 to 500 μm, 2 to 450 μm, or 2 to 200 μm.

With the excellent optical properties and mechanical properties as such, the polyimide film for a cover window shows a sufficiently low retardation at various angles in a cover window of a display device and the like, and thus, it is expected that the range of application may be expanded in various industrial fields where a wide viewing angle may be secured.

The polyimide film for a cover window according to an implementation satisfies all of the yellow index, the retardation in the thickness direction, the modulus, and the elongation at break in the ranges described above, thereby preventing image distortion by light to impart further improved visibility. In addition, more uniform mechanical properties (such as modulus) and optical properties (such as yellow index and retardation in the yellow thickness direction) may be shown overall in the center and on the edge of the film, and a film loss may be further decreased. In addition, since the polyimide film for a cover window is flexible and has excellent bending properties, the film may be more easily restored to its original form without deformation and/or damage even when predetermined deformation occurs repeatedly.

The cover window including the polyimide film for a cover window according to an implementation may have better visibility, and prevent fold marks and microcrack occurrence, thereby imparting better durability and long life properties of a flexible display device.

The polyimide film for a cover window according to an implementation may be manufactured from a polyimide resin including the structural units derived from a diamine and a dianhydride as exemplified above, and specifically, the polyimide resin may have a weight average molecular weight (Mw) of 10,000 to 80,000 g/mol, 10,000 to 70,000 g/mol, or 10,000 to 60,000 g/mol, but the present invention is not limited thereto.

As described above, the polyimide film for a cover window according to an implementation may have excellent optical properties and mechanical properties, thereby showing a sufficiently low retardation at various angles in a cover window of a display device and the like, and thus, may be applied in various industrial fields requiring securing of a wide viewing angle.

As an example, the display device is not particularly limited as long as it belongs to a field requiring excellent optical properties, and may be provided by selecting a display panel appropriate therefor. Specifically, the polyimide film for a cover window may be applied to a flexible display device. A non-limiting example thereof may include various image display devices such as a liquid crystal display device, an electroluminescence display device, a plasma display device, and a field emission display device, and the like, but is not limited thereto.

In addition, the display device including the polyimide film for a cover window according to an implementation described above has excellent display quality which is displayed as high transparency and also a significantly reduced distortion by light, and thus, particularly, may significantly improve a rainbow phenomenon in which iridescent stains occur and minimize the user's eye strain with excellent visibility. In particular, as a screen size of a display device is increased, the screen is often seen from the side, and when the polyimide film for a cover window according to an implementation is applied to a display device, visibility is excellent even when seen from the side, and thus, the film may be usefully applied to a large display device.

Hereinafter, the method for manufacturing a polyimide film for a cover window according to an implementation will be described.

In an implementation, the preparation method is not limited as long as a cured film formed at a thickness of 30 to 150 μm satisfying both physical properties of the absolute value of the retardation in the thickness direction ($R_{th}$) at a wavelength of 550 nm of 500 nm or less and a yellow index (YI) in accordance with ASTM E313 of 3.5 or less is manufactured, and the method described later is specifically illustrated as an example, and the present invention is not limited to the method described later as long as a film satisfying the physical properties is manufactured.

Specifically, the method for manufacturing a polyimide film for a cover window according to an implementation may include applying the composition for a polyimide film for a cover window described above on a substrate such as glass and then performing thermal curing or drying and thermal curing. More specifically, the method includes: i) reacting a dianhydride and a diamine in the presence of an amide-based solvent to prepare a polyamic acid and/or a polyimide solution; ii) further adding a hydrocarbon-based solvent to the polyamic acid and/or the polyimide solution to adjust crystallinity of the polyamic acid and/or the polyimide; and iii) applying the composition for forming a polyimide film for a cover window obtained in step ii) on a substrate and performing curing, wherein the hydrocarbon-based solvent in step ii) may be further added so as to be 10 to 40 wt % with respect to a total weight of the amide-based solvent and the hydrocarbon-based solvent. Here, the dianhydride and the diamine may be as described above, respectively, and for example, the dianhydride may include the compound represented by Chemical Formula 1 and the compound represented by Chemical Formula 2, and the diamine may include the compound represented by Chemical Formula 3 and the compound represented by Chemical Formula 4.

Specifically, in the method for manufacturing a polyimide film for a cover window according to an implementation, the polyamic acid and/or the polyimide solution may include 70 to 95 mol % of the compound represented by Chemical Formula 1, based on 100 mol % of the dianhydride. In addition, the compound represented by Chemical Formula 2 may be included at 5 to 30 mol % with respect to 100 mol % of the dianhydride. In addition, the compound represented by Chemical Formula 1 may be included at 70 to 90 mol % or 70 to 85 mol %.

Specifically, in the method for manufacturing a polyimide film for a cover window according to an implementation, the polyamic acid and/or the polyimide solution may include 70 to 95 mol % of the compound represented by Chemical Formula 3, based on 100 mol % of the diamine. In addition, the compound represented by Chemical Formula 4 may be included at 5 to 30 mol % with respect to 100 mol % of the diamine. In addition, the compound represented by Chemical Formula 3 may be included at 70 to 90 mol %, more specifically 70 to 90 mol %.

In addition, the dianhydride and the diamine may be included at a mole ratio of 1:0.9 to 1:1.1, in which the dianhydride may include the compound represented by Chemical Formula 1 and the compound represented by Chemical Formula 2, and for example, the moles of the dianhydride may be the sum of the moles of the compound represented by Chemical formula 2 and the moles of the compound represented by Chemical Formula 2.

In addition, the polyamic acid and/or the polyimide solution satisfying the mol % as such may have a solid content of 10 to 40 wt %, based on a total weight. Here, the solid content may be the polyamic acid and/or the polyimide, and the residual amount may be an organic solvent.

In the method for manufacturing a polyimide film for a cover window according to an implementation, the solid content of the polyamic acid and/or the polyimide solution may be in a range of 40 wt % or less, 35 wt % or less, or 10 to 20 wt %. More specifically, according to an implementation, the polyamic acid and/or the polyimide solution has a low viscosity even when the solid content is 10 to 20 wt %, and thus, may provide an advantage in the process. In general, the absolute value of the retardation in the thickness direction ($R_{th}$) and the mechanical properties such as the modulus are in a trade-off relationship with each other, and thus, it was difficult to improve both of the physical properties. However, according to an implementation, both of the physical properties may be improved even at a thickness of 30 μm or more.

Adjusting the crystallinity of the polyamic acid in step ii) may be performed by further adding the hydrocarbon-based solvent to the polyamic acid solution, or may be performed by further adding the hydrocarbon-based solvent and a solvent other than the hydrocarbon-based solvent. Here, the other solvent may be an amide-based solvent, and the amide-based solvent may be the same or different from the amide-based solvent added in step i). By adding the hydrocarbon-based solvent, an intermolecular interaction between the polyamic acids and/or polyimides, and/or an interaction between a polymer and a solvent may be effectively inhibited, and an intermolecular packing density may be significantly decreased during curing. Accordingly, according to an implementation, a polyimide film for a cover window, which has significantly improved yellow index and retardation in the thickness direction ($R_{th}$) at a wavelength of 550 nm, and satisfies a thickness of 30 μm to implement mechanical properties comparable to tempered glass, may be provided. In particular, a polyimide film for a cover window, which satisfies the thickness of 30 μm or more but has significantly reduced mura phenomenon depending on a viewing angle, may be provided.

The curing step may be performed by thermal curing. Here, the thermal curing may be replaced with various known methods such as chemical curing, infrared curing, batchwise curing, and continuous curing or may be replaced with a different kind of curing method.

The thermal curing may be performed at 80 to 300° C., 100 to 280° C., or 150 to 250° C.

The thermal curing may be performed at 80 to 100° C. for 1 minute to 2 hours, at higher than 100° C. to 200° C. for 1 minute to 2 hours, or at higher than 200° C. to 300° C. for 1 minute to 2 hours, and stepwise thermal curing may be performed under two or more temperature conditions selected therefrom. In addition, the thermal curing may be performed in a separate vacuum oven, an oven filled with inert gas, or the like, but the present invention is not necessarily limited thereto.

In addition, a drying step may be further performed before the thermal curing, if necessary. The drying step may be performed at 30 to 70° C., 35 to 65° C., or 40 to 55° C., but is not limited thereto.

In addition, in the method of manufacturing a polyimide film for a cover window according to an implementation, the application for forming the polyimide film may be used without limitation as long as it is commonly used in the art. A non-limiting example thereof may include knife coating, dip coating, roll coating, slot die coating, lip die coating, slide coating, curtain coating, and the like, and the same or different kind of application may be successively applied once or more thereto, of course.

The substrate may be used without limitation as long as it is commonly used in the art, and a non-limiting example thereof includes glass; stainless steel; plastic films such as polyethylene terephthalate, polyethylene naphthalate, polypropylene, polyethylene, cellulose triacetate, cellulose diacetate, poly(meth)acrylic acid alkyl ester, poly(meth)acrylic acid ester copolymer, polyvinyl chloride, polyvinyl alcohol, polycarbonate, polystyrene, cellophane, polyvinylidene chloride copolymer, polyamide, polyimide, vinyl chloride/vinyl acetate copolymer, polytetrafluoroethylene, and polytrifluoroethylene, or the like.

The method for manufacturing a polyimide film for a cover window according to an implementation may further include a standing step of applying the composition for forming a polyimide film for a cover window on the substrate, and then allowing it to stand at normal temperature, if necessary. The optical properties on the film surface may be maintained more stable by the standing step. Without being bound to a certain theory, when a conventional composition for forming a polyimide film for a cover window is subjected to the standing step as such before curing, the solvent absorbs moisture in the air, and the moisture diffuses inside and collides with the polyamic acid and/or the polyimide to cause cloudiness from the film surface and to cause agglomeration, thereby causing coating unevenness. However, the composition for forming a polyimide film for a cover window according to an implementation has no cloudiness and agglomeration even when it is left in the air for a long time, and may secure a film having improved optical properties.

The standing step may be performed at normal temperature and/or in a high humidity condition. Here, the normal temperature may be 40° C. or lower, for example, 30° C. or lower, for example, 25° C. or lower, more specifically, 15° C. to 25° C., and for example, 20 to 25° C. In addition, high humidity may be a relative humidity of 50% or more, for example, 60% or more, for example, 70% or more, and for example, 80% or more.

The standing step may be performed for 1 minute to 3 hours, for example, for 10 minutes to 2 hours, and for example, for 20 minutes to 1 hour.

In the method for manufacturing a polyimide film for a cover window according to an implementation, the polyimide film for a cover window may be manufactured by mixing the polyamic acid solution with one or two or more additives selected from a flame retardant, an adhesive strength improver, inorganic particles, an anti-oxidant, a UV blocking agent, a plasticizer, and the like.

Hereinafter, an example will be described for describing an implementation in detail, but the present invention is not limited to the following examples.

In the following experimentation, the physical properties were measured as follows.

<Yellow Index (YI)>

A yellow index was measured using a spectrophotometer (Nippon Denshoku, COH-5500) in accordance with the specification of ASTM E313.

Example 1

Preparation of Composition for Forming Polyimide Film for Cover Window (TFMB (0.9)/DDS (0.1)/BPAF (0.7)/6FDA (0.3))

An agitator in which a nitrogen stream flowed was filled with 284.5 g of N,N-dimethylpropionamide (DMPA), and 26.9 g of 2,2'-bistrifluoromethylbenzidine (2,2'-bis(trifluoromethyl)-4,4'-biphenyl diamine, TFMB) and 2.32 g of 4,4'-diaminodiphenyl sulfone (DDS) were dissolved therein while the temperature of the reactor was maintained at 25° C. 30 g of 9,9-bis(3,4-dicarboxyphenyl)fluorene dianhydride (BPAF) and 12.45 g of 2,2-bis-(3,4-dicarboxyphenyl) hexafluoropropane dianhydride (6FDA) were added thereto at 25° C., and dissolution and reaction were performed while stirring the solution for 6 hours. Thereafter, 121.9 g of toluene was added at 25° C., and stirring was performed for 18 hours. Thereafter, DMPA and/or toluene was/were added so that a solid content was 14 wt % and the content of toluene in the composition was 30 wt % (that is, DMPA:tolulene=70 wt %:30 wt %) with respect to the total weight of DMPA and toluene, thereby preparing a composition 1 for forming a polyimide film for a cover window.

Manufacture of Polyimide Film for Cover Window

The composition 1 for a polyimide film for a cover window obtained above was applied on one surface of a glass substrate (1.0 T) with a #20 meyer bar, was cured by heating at 80° C. for 30 minutes and then at 350° C. for 15 minutes under a nitrogen stream, and was peeled off from the glass substrate, thereby obtaining the polyimide film for a cover window of Example 1 having a thickness of 50 μm.

Example 2

Manufacture of Composition for Forming Polyimide Film for Cover Window (TFMB (0.85)/DDS (0.15)/BPAF (0.7)/6FDA (0.3))

An agitator in which a nitrogen stream flowed was filled with 283.2 g of N,N-dimethylpropionamide (DMPA), and 25.4 g of 2,2'-bistrifluoromethylbenzidine (2,2'-bis(trifluoromethyl)-4,4'-biphenyl diamine, TFMB) and 3.47 g of 4,4'-diaminodiphenyl sulfone (DDS) were dissolved therein while the temperature of the reactor was maintained at 25° C. 30 g of 9,9-bis(3,4-dicarboxyphenyl)fluorene dianhydride (BPAF) and 12.45 g of 2,2-bis-(3,4-dicarboxyphenyl) hexafluoropropane dianhydride (6FDA) were added thereto at 25° C., and dissolution and reaction were performed while stirring the solution for 6 hours. Thereafter, 121.4 g of toluene was added at 25° C., and stirring was performed for 18 hours. Thereafter, DMPA and/or toluene was/were added so that a solid content was 14 wt % and the content of toluene in the composition was 30 wt % (that is, DMPA:tolulene=70 wt %:30 wt %) with respect to the total weight of DMPA and toluene, thereby preparing a composition 2 for forming a polyimide film for a cover window.

Manufacture of Polyimide Film for Cover Window

The polyimide film for a cover window of Example 2 having a thickness of 50 μm was obtained in the same manner as in Example 1, using the composition 2 for forming a polyimide film for a cover window obtained.

Examples 3 and 4

Each of compositions 3 and 4 for forming a polyimide film for a cover window was manufactured in the same manner as in Example 1, except that the content of toluene (T content) with respect to the total weight of DMPA and toluene was adjusted as shown in the following Table 1.

Manufacture of Polyimide Film for Cover Window

The polyimide films for a cover window of Examples 3 and 4 having a thickness of 50 μm were obtained in the same manner as in Example 1, using each of the composition for forming a polyimide film for a cover window obtained.

Comparative Examples 1 and 2

Each of compositions A and B for forming a polyimide film for a cover window was manufactured in the same manner as in Example 1, except that the content of toluene (T content) with respect to the total weight of DMPA and toluene was adjusted as shown in the following Table 1.

The compositions A and B for a polyimide film for a cover window obtained above were applied on one surface of a glass substrate (1.0 T) with a #20 meyer bar, was cured by heating at 80° C. for 15 minutes and then at 350° C. for 15 minutes under a nitrogen stream, and was peeled off from the glass substrate, thereby obtaining the polyimide films for a cover window of Comparative Example 1 and 2 having a thickness of 50 μm.

Comparative Example 3

Manufacture of Polyimide Film for Cover Window (TFMB (1)/PMDA (0.3)/BPAF (0.7))

An agitator in which a nitrogen stream flowed was filled with 484 g of N,N-dimethylpropionamide (DMPA), and 29.9 g of 2,2'-bistrifluoromethylbenzidine (2,2'-bis(trifluoromethyl)-4,4'-biphenyl diamine, TFMB) was dissolved therein while the temperature of the reactor was maintained at 25° C. 30 g of 9,9-bis(3,4-dicarboxyphenyl)fluorene dianhydride (BPAF) and 6.1 g of pyromellitic dianhydride (PMDA) were added thereto at 25° C., and dissolution and reaction were performed while stirring the solution for 24 hours. Thereafter, a DMPA solvent was further added so that a solid content was 12 wt %, thereby preparing a composition C for forming a polyimide film for a cover window.

The compositions C for a polyimide film for a cover window obtained above was applied on one surface of a glass substrate (1.0 T) with a #20 meyer bar, was cured by heating at 80° C. for 15 minutes and then at 350° C. for 15 minutes under a nitrogen stream, and was peeled off from the glass substrate, thereby obtaining the polyimide film for a cover window of Comparative Example 3 having a thickness of 50 μm.

Comparative Example 4

Manufacture of Polyimide Film for Cover Window (TFMB (1)/PMDA (0.7)/BPAF (0.3))

A composition D for forming a polyimide film for a cover window was prepared in the same manner as in Comparative Example 3, except that the mole ratio of TFMB, PMDA, and BPAF was changed as shown in the following Table 1, and a polyimide film for a cover window having a thickness of 50 μm was obtained.

TABLE 1

|  | T content (wt %) | Dianhydride (mole ratio) | Diamine (mole ratio) |
|---|---|---|---|
| Example 1 | 30 | BPAF (0.7)/6FDA (0.3) | TFMB (0.9)/DDS (0.1) |
| Example 2 | 30 | BPAF (0.7)/6FDA (0.3) | TFMB (0.85)/DDS (0.15) |
| Example 3 | 40 | BPAF (0.7)/6FDA (0.3) | TFMB (0.9)/DDS (0.1) |
| Example 4 | 10 | BPAF (0.7)/6FDA (0.3) | TFMB (0.9)/DDS (0.1) |
| Comparative Example 1 | 50 | BPAF (0.7)/6FDA (0.3) | TFMB (0.9)/DDS (0.1) |
| Comparative Example 2 | 8 | BPAF (0.7)/6FDA (0.3) | TFMB (0.9)/DDS (0.1) |
| Comparative Example 3 | — | PMDA (0.3)/BPAF (0.7) | TFMB (1) |
| Comparative Example 4 | — | PMDA (0.7)/BPAF (0.3) | TFMB (1) |

Evaluation: Yellow Index

The Yellow index (YI) of the polyimide films for a cover window of Examples 1 to 4 and Comparative Examples 1 to 4 were measured and are shown in the following Table 2.

TABLE 2

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Thickness (μm) | 50 | 50 | 50 | 50 | — | 50 | 50 | 50 |
| YI | 1.8 | 1.9 | 1.7 | 2.1 | — | 2.9 | 53 | 80 |

Referring to Table 2, the compositions 1 to 4 for forming a polyimide film for a cover window according to Examples 1 to 4 were able to easily form a polyimide film for a cover window having a thickness of 50 μm or more which is sufficient for use as a cover window. However, the composition A for forming a polyimide film according to Comparative Example 1 had a high initial polymerization solid content, so that a solution viscosity was uncontrollably high or precipitation occurred, and thus, polymerization and manufacture of the polyimide film were impossible.

In addition, it was confirmed that the polyimide films for a cover window manufactured from the compositions 1 to 4 for forming a polyimide film for a cover window according to Examples 1 to 4 had a lower yellow index than the polyimide films for a cover window manufactured from the compositions B to D for forming a polyimide film for a cover window according to Comparative Examples 2 to 4.

In particular, since the polyimide films for a cover window of Comparative Examples 3 and 4 were colored films having poor visibility and a very high yellow index of 53 and 80, respectively, they were confirmed to be more inappropriate for application as a cover window.

Hereinabove, an implementation has been described by specific examples, this has been provided only for assisting in the entire understanding of the present invention, and the present invention is not limited to the examples. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. A composition for forming a polyimide film for a cover window comprising:
   a polyamic acid or a polyimide including a structural unit derived from a dianhydride and a structural unit derived from a diamine; and
   a mixed solvent of an amide-based solvent and a hydrocarbon-based solvent, the hydrocarbon-based solvent being comprised at 10 to 40 wt % with respect to a total weight of the mixed solvent,
   wherein the structural unit derived from a dianhydride comprises a structural unit derived from a compound represented by the following Chemical Formula 1 and a compound represented by the following Chemical Formula 2, and the structural unit derived from a diamine comprises a structural unit derived from a compound represented by the following Chemical Formula 3 and a compound represented by the following Chemical Formula 4:

[Chemical Formula 1]

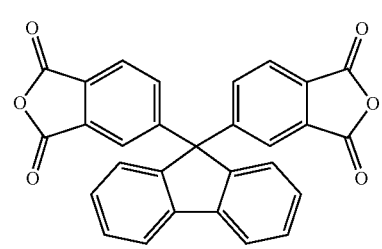

-continued

[Chemical Formula 2]

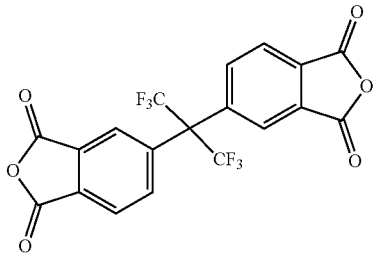

[Chemical Formula 3]

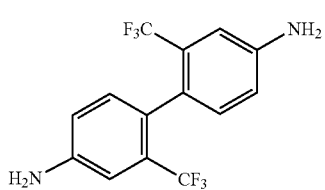

[Chemical Formula 4]

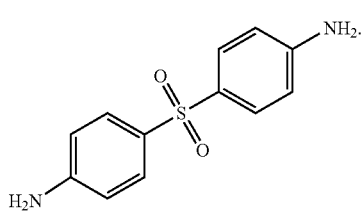

2. The composition for forming a polyimide film for a cover window of claim 1, wherein the amide-based solvent comprises dimethylpropionamide.

3. The composition for forming a polyimide film for a cover window of claim 1, wherein the hydrocarbon-based solvent is a cyclic hydrocarbon-based solvent.

4. The composition for forming a polyimide film for a cover window of claim 3, wherein the cyclic hydrocarbon-based solvent comprises toluene, benzene, cyclohexane, or a combination thereof.

5. The composition for forming a polyimide film for a cover window of claim 1, wherein the composition for forming a polyimide film for a cover window comprises a solid content of 10 to 40 wt % with respect to a total weight of the composition for forming a polyimide film for a cover window.

6. The composition for forming a polyimide film for a cover window of claim 1, wherein the structural unit derived from the compound represented by Chemical Formula 1 is comprised at 70 mol % to 95 mol %, based on 100 mol % of the structural unit derived from a dianhydride.

7. The composition for forming a polyimide film for a cover window of claim 1, wherein the structural unit derived from the compound represented by Chemical Formula 3 is comprised at 70 mol % to 95 mol %, based on 100 mol % of the structural unit derived from a diamine.

8. A method for manufacturing a polyimide film for a cover window, the method comprising the steps of:
   i) reacting a compound represented by the following Chemical Formula 1 and a compound represented by the following Chemical Formula 2 with a compound represented by the following Chemical Formula 3 and a compound represented by the following Chemical Formula 4 in the presence of an amide-based solvent to prepare a polyamic acid solution;
   ii) further adding a hydrocarbon-based solvent to the polyamic acid solution to adjust crystallinity of the polyamic acid; and
   iii) applying a composition for forming a polyimide film for a cover window obtained in step ii) on a substrate and performing curing,
   wherein the hydrocarbon-based solvent in step ii) is further added so as to be 10 to 40 wt % with respect to a total weight of the amide-based solvent and the hydrocarbon-based solvent:

[Chemical Formula 1]

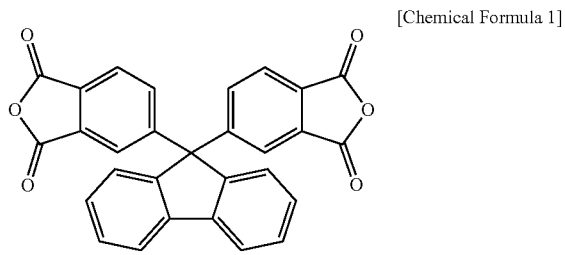

[Chemical Formula 2]

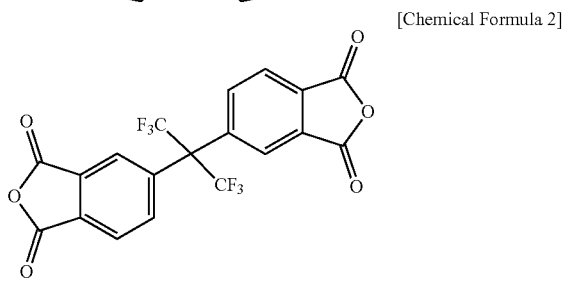

[Chemical Formula 3]

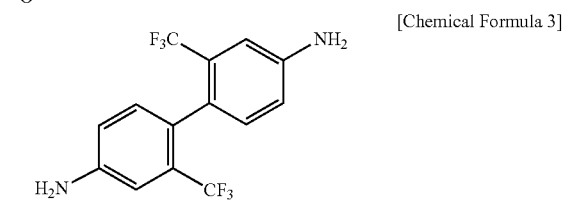

[Chemical Formula 4]

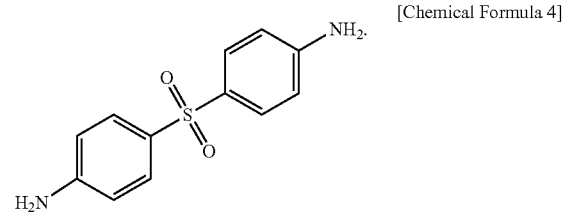

9. The method for manufacturing a polyimide film for a cover window of claim 8, wherein the curing in step iii) is performed by heating at 80 to 300° C.

10. The method for manufacturing a polyimide film for a cover window of claim 8, further comprising:
    after the application in step iii),
    allowing the applied substrate to stand at normal temperature.

11. A polyimide film for a cover window manufactured from the composition for forming a polyimide film for a cover window of claim 1.

12. The polyimide film for a cover window of claim 11, wherein the polyimide film has a thickness of 30 to 150 µm and a yellow index (YI) in accordance with ASTM E313 of 3.5 or less.

13. The polyimide film for a cover window of claim 11, wherein the polyimide film has a thickness of 40 to 80 µm and a yellow index (YI) in accordance with ASTM E313 of 1.0 to 2.7.

14. A multilayer structure comprising the polyimide film of claim 11 formed on one surface of a substrate.

15. The multilayer structure of claim 14, further comprising:
a coating layer formed on the polyimide film.

16. The multilayer structure of claim 15, wherein the coating layer is a hard coating layer, an antistatic layer, an anti-fingerprint layer, an antifouling layer, an anti-scratch layer, a low refractive index layer, an anti-reflection layer, a shock absorbing layer, or a combination thereof.

17. A cover window for a display device comprising the polyimide film of claim 11.

18. A flexible display device comprising the cover window for a display device of claim 17.

\* \* \* \* \*